(12) United States Patent
Pearcy

(10) Patent No.: US 9,301,514 B2
(45) Date of Patent: Apr. 5, 2016

(54) FISHING LURE CONNECTOR

(71) Applicant: Don Pearcy, Rowlett, TX (US)

(72) Inventor: Don Pearcy, Rowlett, TX (US)

( * ) Notice: Subject to any disclaimer, the term of this patent is extended or adjusted under 35 U.S.C. 154(b) by 65 days.

(21) Appl. No.: 13/752,992

(22) Filed: Jan. 29, 2013

(65) Prior Publication Data

US 2014/0208630 A1    Jul. 31, 2014

(51) Int. Cl.
*A01K 91/04* (2006.01)
*A01K 91/03* (2006.01)

(52) U.S. Cl.
CPC .............. *A01K 91/04* (2013.01); *A01K 91/03* (2013.01)

(58) Field of Classification Search
CPC .......... F16B 35/02; F16B 35/00; F16B 19/02; F16B 21/18; F16B 33/002; F16B 39/34; F16B 41/002; F16B 5/10; F16B 5/123; A01K 85/00; A01K 91/04; A01K 91/03; A01K 91/047; A01K 95/02; A01K 97/24
USPC .............. 43/42.36, 42.49, 44.9, 44.91, 44.92, 43/44.94, 43.1, 42.08, 44.98, 44.83; 24/136 L, 135 R, 135 A, 135 K, 135 N; 411/419; 16/205; 439/1, 10, 32, 253, 439/254, 338–340; 403/389, 391, 342
See application file for complete search history.

(56) References Cited

U.S. PATENT DOCUMENTS

| | | | |
|---|---|---|---|
| 1,010,301 A * | 11/1911 | Neats | F16G 11/10 24/115 G |
| 1,023,706 A * | 4/1912 | Anderson | 24/136 L |
| RE19,671 E | 8/1935 | Jordan | |
| 2,062,245 A * | 11/1936 | Arens | 24/601.8 |
| 2,214,961 A | 9/1940 | Hawley | |
| 2,255,793 A * | 9/1941 | Kridler | 43/42.08 |
| 2,793,461 A | 5/1957 | Korte | |
| 2,890,510 A * | 6/1959 | Spalding | 403/211 |
| 3,105,318 A * | 10/1963 | Birrell | A01K 93/00 43/42.74 |
| 3,177,606 A | 4/1965 | Benoit | |
| 3,335,472 A | 8/1967 | Imai | |
| 3,392,476 A | 7/1968 | Zielaskowski | |
| 3,754,347 A | 8/1973 | McGahee | |
| 3,782,025 A * | 1/1974 | Kochevar | 43/44.9 |
| 3,803,747 A | 4/1974 | Cartwright | |
| 3,826,034 A | 7/1974 | Herek | |
| 3,848,354 A | 11/1974 | Austad | |
| 3,943,652 A | 3/1976 | Aunspaugh | |
| 4,060,926 A | 12/1977 | Cordell, Jr. | |
| 4,112,551 A * | 9/1978 | Sales | A45C 13/1046 24/136 B |
| 4,141,116 A | 2/1979 | Zalonis | |
| 4,177,598 A | 12/1979 | Jolley | |
| 4,467,550 A | 8/1984 | Haulk | |
| 4,553,348 A | 11/1985 | Cooper | |
| 4,870,776 A | 10/1989 | Schock | |
| 4,879,835 A | 11/1989 | Sprayberry | |
| 4,998,371 A | 3/1991 | Driesel | |
| 5,007,140 A | 4/1991 | Brookey | |
| 5,181,337 A | 1/1993 | DuBois | |
| 5,203,105 A | 4/1993 | Bond | |
| 5,299,378 A | 4/1994 | Ballard | |
| 5,383,905 A * | 1/1995 | Golds et al. | 606/232 |
| 5,394,636 A | 3/1995 | Rabideau | |

(Continued)

*Primary Examiner* — Darren W Ark
*Assistant Examiner* — George Andonyan
(74) *Attorney, Agent, or Firm* — James R. Gourley; Carstens & Cahoon, LLP

(57) ABSTRACT

The present invention is a fishing lure connector that traps a portion of fishing line inside a threaded male/female connection between a pole side base and a lure side base.

6 Claims, 4 Drawing Sheets

(56) References Cited

U.S. PATENT DOCUMENTS

| | | | |
|---|---|---|---|
| 5,647,163 A | 7/1997 | Gorney | |
| 5,881,490 A | 3/1999 | Richardson | |
| 5,901,495 A | 5/1999 | Leigeber | |
| 6,125,574 A * | 10/2000 | Ganaja et al. | 43/43.1 |
| 6,260,241 B1 * | 7/2001 | Brennan | F16G 11/00 24/115 K |
| 7,178,841 B1 * | 2/2007 | Moreno | 292/327 |
| 7,674,276 B2 * | 3/2010 | Stone | A61B 17/0401 24/135 N |
| 7,707,697 B2 * | 5/2010 | Brennan | F16G 11/00 24/115 R |
| 7,861,457 B2 * | 1/2011 | Blette et al. | 43/44.9 |
| 8,096,024 B2 * | 1/2012 | Smith et al. | 24/136 K |
| 8,276,311 B2 * | 10/2012 | Cowin | 43/44.91 |
| 2002/0083636 A1 | 7/2002 | Thorne | |
| 2003/0019146 A1 | 1/2003 | McNally | |
| 2004/0074134 A1 | 4/2004 | Morlen | |
| 2004/0079022 A1 | 4/2004 | Owen | |
| 2004/0107629 A1 | 6/2004 | Brzozowski | |
| 2005/0034356 A1 * | 2/2005 | Blette et al. | 43/44.9 |
| 2006/0016118 A1 | 1/2006 | Zuk | |
| 2007/0227059 A1 * | 10/2007 | Cox et al. | 43/25.2 |
| 2008/0155885 A1 | 7/2008 | Corbitt | |
| 2009/0044441 A1 * | 2/2009 | Neal et al. | 43/44.83 |
| 2010/0175303 A1 | 7/2010 | Caison | |
| 2010/0269397 A1 | 10/2010 | Hale | |
| 2011/0131865 A1 * | 6/2011 | Loe | 43/43.14 |
| 2013/0014427 A1 * | 1/2013 | Rothan | 43/43.1 |

* cited by examiner

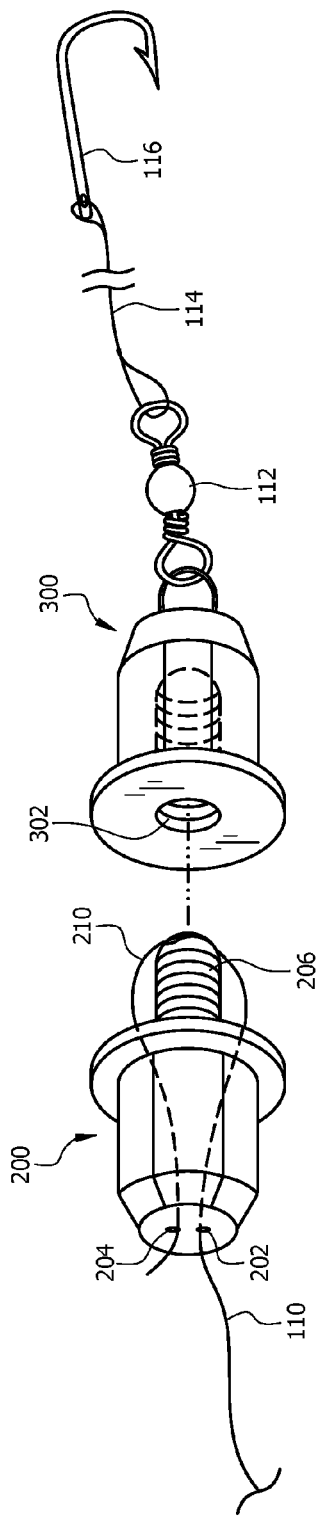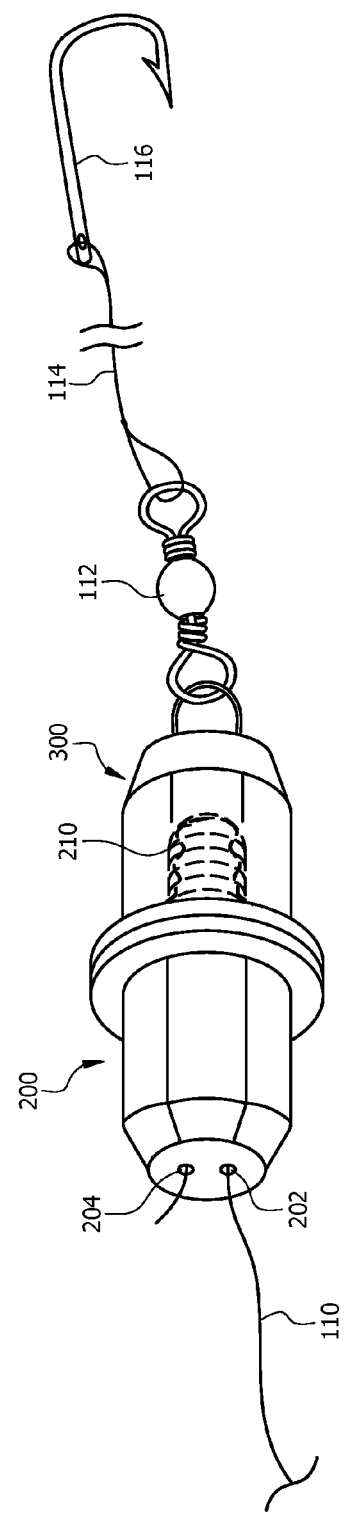

FISHING LURE CONNECTOR

BACKGROUND OF THE INVENTION

Sea creatures, and in particular fish, which are found in various bodies of water such as lakes, ponds, rivers, streams and oceans, have been essential to the sustainability of life for mankind. Humans have utilized devices such as fishing poles and/or fishing nets to capture and remove fish from their natural habitats. After removal, the fish can be consumed as food. Additionally, fish are a vital part of the cycle of life for organisms that inhabit the water and air. As such, fish not only aid in the proper functioning of the ecosystem, but also provide sustenance and nourishment as food for mankind. Therefore, fish serve various useful purposes and functions.

Over the centuries, the art and science of catching fish, which is known as fishing, is an important sport and pastime in the lives of many people. One of the difficulties faced by fishermen is affixing a fishing lure or bait hook to the fishing line used on a fishing pole. Amateur fishermen are typically not skilled in knot tying, which causes them to sometimes use incorrect knots. Children and the elderly can lack the fine motor skills needed to manipulate fishing line. Also, adverse weather conditions can make knot tying even more difficult. Adding to the problem is the frequency with which amateur fishermen hook a lure or bait hook on an underground structure, such as a plant, tree root, or tree branch, forcing the fisherman to break the line and affix a new lure or hook. An amateur can spend a significant portion of a fishing trip attempting to tie knots instead of attempting to catch fish.

The present invention overcomes these and other difficulties encountered in the prior art of affixing a fishing lure or bait hook to the fishing line loaded on a fishing pole.

SUMMARY OF THE INVENTION

The present invention is a fishing lure connector apparatus, system and method of use. In one embodiment of the invention, a fishing lure connector comprises a pole side base and a lure side base, wherein said pole side base and lure side base are configured to connect by a male/female threaded connection, and trap a length of fishing line between a male threaded member of said threaded connection and a female threaded socket of said threaded connection.

In another embodiment, the pole side base comprises a male threaded member, and the lure side base comprises a female threaded socket. In another embodiment, the male threaded member comprises a fishing line stabilizer in close proximity to a distal end of said member. In still another embodiment, the fishing line stabilizer comprises at least one of a slot and a hole.

In one embodiment, the pole side base comprises at least one fishing line stabilizer, which may comprise at least one of a slot and a hole. In another embodiment, the pole side base comprises a female threaded socket, and the lure side base comprises a male threaded member. In another embodiment, the threaded connection comprises a ridge and groove connection.

In one embodiment of the present invention, a lure side base is adapted to mate with a pole side base to form a fishing lure connector, wherein said pole side base and lure side base are configured to connect by a male/female threaded connection, and trap a length of fishing line between a male threaded member of said threaded connection and a female threaded socket of said threaded connection.

In another embodiment, a pole side base is adapted to mate with a lure side base to form a fishing lure connector, wherein said pole side base and lure side base are configured to connect by a male/female threaded connection, and trap a length of fishing line between a male threaded member of said threaded connection and a female threaded socket of said threaded connection.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 2 is a perspective view of one embodiment of the fishing lure connector of the present invention apart;

FIG. 3 is a perspective view of one embodiment of the fishing lure connector of the present invention mated;

DETAILED DESCRIPTION OF THE INVENTION

In one embodiment, the present invention comprises a fishing lure connector. In its broadest sense, the fishing lure connector comprises two pieces: a pole side base and a lure side base. The pole side base attaches to fishing line on the side of the line that is closest to a fishing pole using said line. Typically the fishing line will be wound inside a fishing reel, which is attached to the fishing pole. One end of the line extends from the reel and through several loops attached to the fishing pole at various points between the reel and the tip of the pole. It is this end of the line that, in the prior art, is tied to a fishing lure or other accessory, such as a weight or bobber.

Importantly, although the invention is described and claimed with reference to a fishing pole, it need not be used in conjunction with a fishing pole. Even though fishing with a pole is the most popular line and lure based method, the present invention may also be used with other types of line and lure based fishing that do not rely on a fishing pole. The base of the present invention referred to as the pole side base is on the side of the connector opposite the lure.

As used herein, the terms "lure" and "fishing lure" are synonymous, and are used to refer to any device designed to attract and/or catch a fish, including hooks with or without live bait attached, as well as devices meant to mimic live bait, such as spinners, poppers and jigs.

Figure 1:
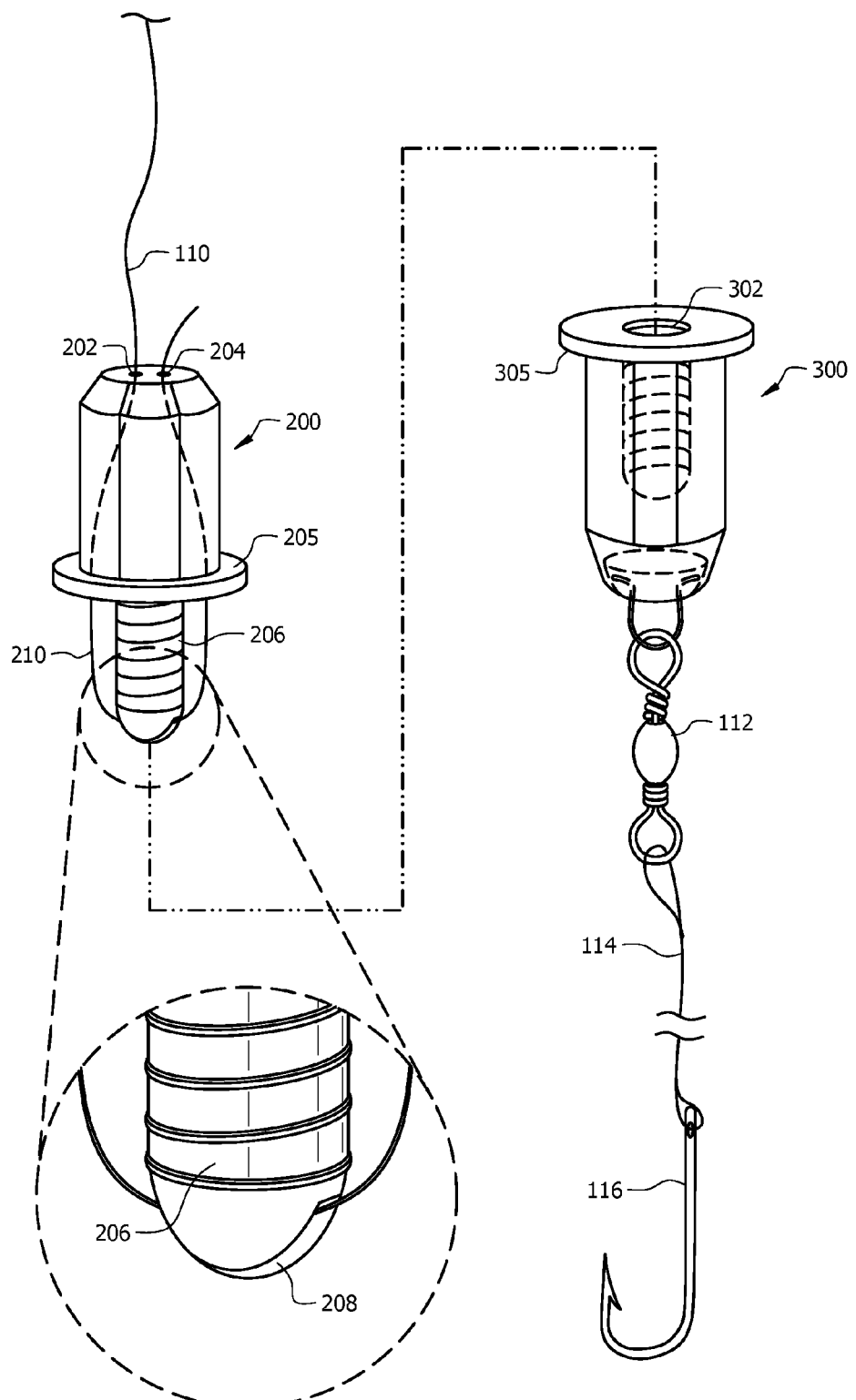
FIG. 1 is an exploded view of one embodiment of the fishing lure connector of the present invention.

FIG. 1 depicts a perspective view of one embodiment of the present invention, with the pole side base 200 and lure side base 300 unmated. Therein, the pole side base 200 is depicted comprising a fishing line entry hole 202 and a fishing line exit hole 204. The pole side base also comprises a circumferential flange 205 and a male threaded member 206 comprising a line stabilizer 208 at the distal end of the member. In the embodiment shown in FIG. 1, the line stabilizer is a slot at the distal end of the threaded male member. However, the line stabilizer can comprise any structure that helps maintain a portion of the fishing line in close proximity to the threaded male member as it is mated with the female threaded socket of the lure side base.

FIG. 1 also depicts a lure side base 300 for one embodiment of the present invention. The lure side base comprises a threaded female socket 302 configured to mate with the threaded male member 206 of the pole side base 200, and thereby trap a portion of the fishing line 110 between the threaded male member and the threaded portion of the threaded female socket. The lure side base also comprises a circumferential flange 305 which is configured to engage the circumferential flange 205 of the pole side base 200, wherein the flanges engage each other at opposing faces thereof when said male/female threaded connection is made. The lure side base may also comprise an attached swivel 112, line 114 and hook 116, as depicted in FIG. 1. In other embodiments, the list of fishing lures and accessories that can be attached to the lure side base is almost limitless.

Figure 4:
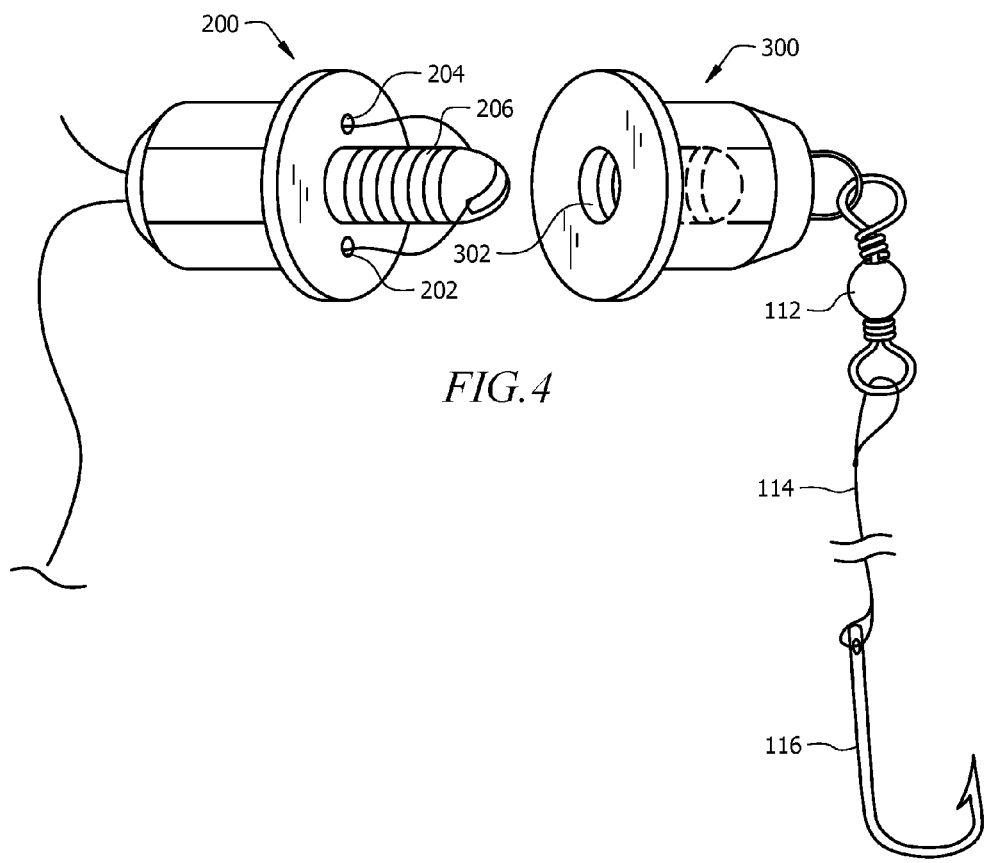
FIG. 4 is another perspective view of one embodiment of the fishing lure connector of the present invention apart.
Figure 5:
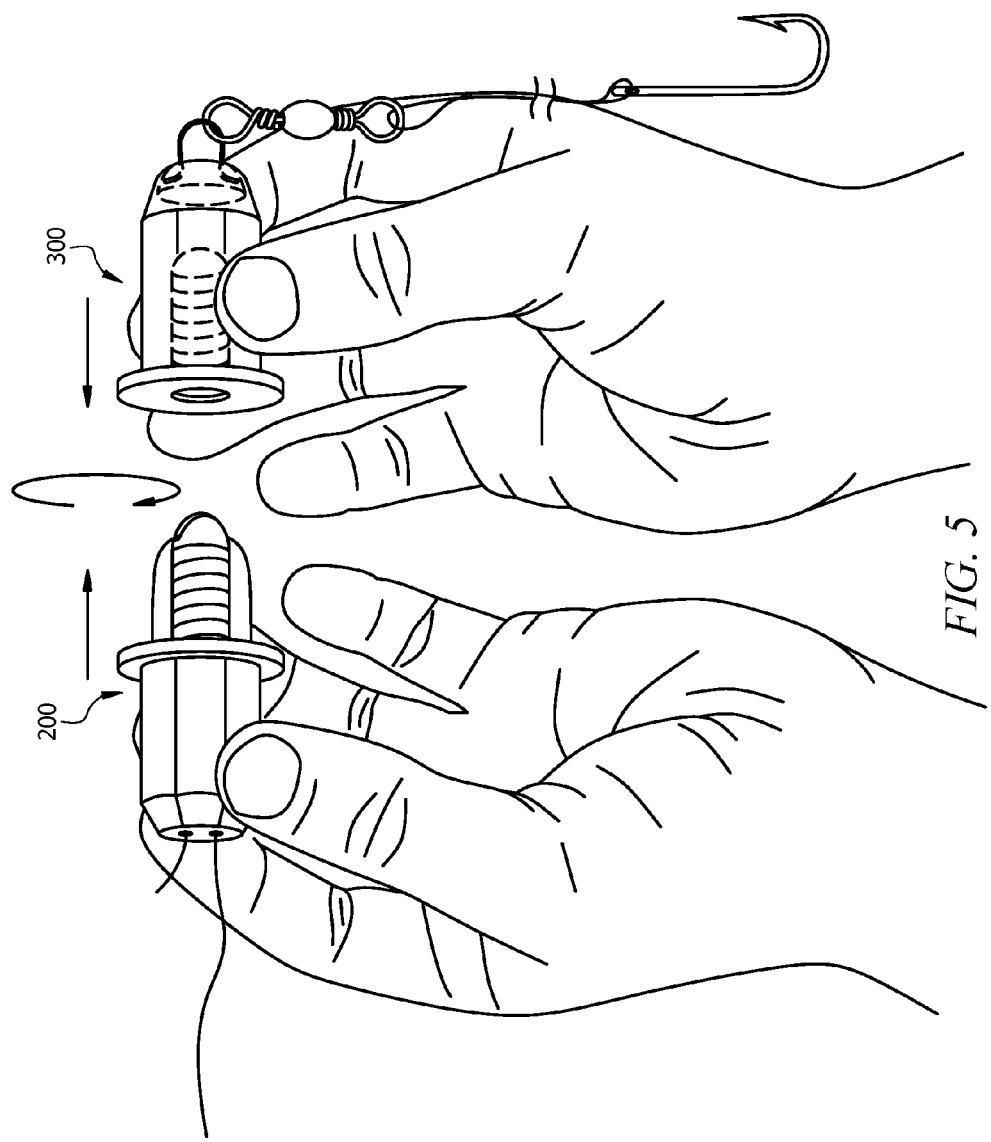
FIG. 5 is a perspective view of one embodiment of the fishing lure connector of the present invention in the process of being mated.

In one example of a method of using the embodiment shown in FIG. 1, a fisherman will thread the end of the fishing line 110 through the entry hole 202 starting at the orifice furthest away from the male member 206, stabilize the line in the line stabilizer 208, and thread the fishing line through the exit hole 204 starting at the orifice closest to the male member 206. The fisherman can then connect the pole side base with the lure side base by aligning the male threaded member with the female threaded socket, pressing and twisting to mate the male threaded member with the female threaded socket, as depicted in FIG. 5. FIGS. 2 and 3 depict the lure side base and pole side base unmated and mated, respectively. FIG. 3 depicts the portion of fishing line 210 trapped between the male member and the female socket. FIG. 4 depicts the member side of the fishing line entry hole 202 and fishing line exit hole 204.

Lures or other fishing accessories can be attached to the lure side base before, during or after the lure side base is connected to the pole side base. Lures or other fishing accessories can also be integral to, or provided with the lure side base. For example, in one embodiment, the lure side base can form a fishing lure itself when mated with the pole side base. In another embodiment, a kit is provided that comprises one or more pole side bases and one or more lure side bases with preselected lures and/or hooks attached.

In another embodiment of the present invention, the pole side base comprises a female threaded socket and the lure side base comprises a male threaded member. In this embodiment, entry and exit holes may also be provided which allow the fisherman to thread the fishing line through the entry hole, into the female threaded socket, and out the exit hole. The male threaded member of the lure side base can then be mated with the female threaded socket of the pole side base, thereby trapping the fishing line between the male threaded member and the female threaded socket.

The entry and exit holes, and the line stabilizer, are not critical to the present invention in its broadest respect. The common feature between various embodiments of the fishing lure connector of the present invention is that, when in use, a portion of the fishing line is trapped between a male threaded member and a female threaded socket, thereby attaching the connector to fishing line without the use of a knot in the fishing line. In other words, in one embodiment, the fishing lure connector comprises a pole side base and a lure side base, wherein the pole side base and lure side base are configured to connect by a male/female threaded connection, and trap a length of fishing line between a male threaded member of the threaded connection and a female threaded socket of the threaded connection.

In another embodiment, the thread on the threaded male member comprises a circumferential ridge, and the female threaded socket comprises a circumferential groove configured to receive and mate with the circumferential ridge. In another embodiment, the female socket may comprise the ridge and the male member the groove. A circumferential ridge is a ridge, which may or may not be interrupted by gaps, that runs around the circumference of the male member or female socket, which does not vary axially. A corresponding groove is provided in the male member or female socket, as appropriate, which is configured to receive and mate with the ridge. In this embodiment, the lure side base and pole side base will mate by "snapping" the two pieces together, instead of or in addition to twisting. In these embodiments, the fishing line is still trapped between the ridge/thread and the groove.

Although the many embodiments of the present invention have been illustrated in the accompanying Drawings and described in the foregoing Detailed Description, it should be understood that the present invention is not limited to the embodiments disclosed, but is capable of numerous rearrangements, modifications, and substitutions of parts and elements without departing from the spirit and scope of the invention.

What is claimed is:
1. A fishing lure connector comprising:
a pole side base and a lure side base, wherein said lure side base is attached to a fishing lure comprising a hook, wherein said pole side base and lure side base are configured to connect by a male/female threaded connection, and trap a length of fishing line between a male threaded member of said threaded connection and a female threaded socket of said threaded connection, wherein said pole side base comprises a fishing line entry hole having a length both defined between opposing ends of the fishing line entry hole and extending along a longitudinal axis of said pole side base, a fishing line exit hole having a length both defined between opposing ends of the fishing line exit hole and extending along said longitudinal axis of said pole side base, said male threaded member, a first circumferential flange extending therearound, and a fishing line stabilizer, said fishing line stabilizer is at a distal end of said male threaded member, such that said length of fishing line is trapped when said fishing line is passed through said fishing line entry hole starting at an orifice of said fishing line entry hole which is at one end of said opposed ends of said fishing line entry hole furthest from said male threaded member, stabilized in said fishing line stabilizer, and passed back through said fishing line exit hole starting at an orifice of said fishing line exit hole which is at one end of said opposed ends of said fishing line exit hole closest to said male threaded member, and mating said male threaded member with said female threaded socket, further wherein said lure side base comprises said female threaded socket and a second circumferential flange extending therearound, wherein said first and second circumferential flanges are configured to engage with each other at opposing faces thereof when said male/female threaded connection is made.

2. The fishing lure connector of claim 1 wherein said fishing line stabilizer comprises at least one of a slot and a hole.

3. The fishing lure connector of claim 1 wherein said pole side base comprises a female threaded socket, and wherein said lure side base comprises a male threaded member.

4. The fishing lure connector of claim 1 wherein said threaded connection comprises a ridge and groove connection.

5. The fishing lure connector of claim 3 wherein said pole side base comprises at least one fishing line stabilizer.

6. The fishing lure connector of claim 5 wherein said at least one fishing line stabilizer comprises at least one of a slot and a hole.

* * * * *